Dec. 2, 1969 W. G. ANSLEY 3,482,088
SOLID STATE LIGHT SOURCE
Filed Jan. 30, 1967 2 Sheets-Sheet 1

INVENTOR
WILLIAM G. ANSLEY
BY Roland I. Griffin
ATTORNEY

Dec. 2, 1969 W. G. ANSLEY 3,482,088

SOLID STATE LIGHT SOURCE

Filed Jan. 30, 1967 2 Sheets-Sheet 2

INVENTOR
WILLIAM G. ANSLEY
BY Roland I. Griffin
ATTORNEY

United States Patent Office

3,482,088

Patented Dec. 2, 1969

3,482,088

SOLID STATE LIGHT SOURCE

William G. Ansley, Mountain View, Calif., assignor to Hewlett-Packard Company, Palo Alto, Calif., a corporation of California Filed Jan. 30, 1967, Ser. No. 612,534
Int. Cl. F21v *9/08*
U.S. Cl. 240—46.59 2 Claims

ABSTRACT OF THE DISCLOSURE

A solid state light source employing a gallium-arsenide-phosphide electroluminescent diode, hereinafter referred to as a GaAsP EL diode, to emit a narrow band of red light near the long wavelength end of the visible spectrum and a red filter with a long wavelength passband to pass this narrow band of red light substantially to the exclusion of the remaining light of the visible spectrum.

BACKGROUND OF THE INVENTION

Solid state light sources potentially have many applications because of their small size and low power requirements. For example, they may capture a large segment of the character display market by replacing the larger and higher power cathode indicator glow display tubes, such as "Nixie" tubes. Up to now, however, a serious limitation on their use in character displays has been that in high ambient light the contrast between the light they emit and the surrounding area (including the nonemitting portions of the light source) is weaker than desirable. This weak contrast may be explained with the aid of FIGURE 1. A fraction 10 of the ambient light 12 striking the surface of the solid state light source 14 is reflected (and/or scattered) toward the viewer. The viewer sees this reflected light 10 in addition to the light 16 emitted by the light source 14. This substantially reduces the contrast between the emitted light 16 and the surrounding area.

Attempts have been made to enhance the contrast between the light 16 emitted by a solid state light source 14 and the surrounding area by placing either a neutral gray filter or a circular polarizer in front of the light source to minimize the amount of ambient light 10 reflected from the surface of the light source to the eye of the viewer. A neutral gray filter attenuates both the ambient light 12 striking the light source 14 and the fraction 10 of this light that is reflected from the surface of the light source. However, it also attenuates the light 16 emitted by the light source 14 so that the enhancement in contrast is seriously limited. Since the attenuation provided by the gray filter must be high in order to optimize the contrast, the contrast enhancement is limited to a factor of about two by the ambient light reflected from the surface of the gray filter towards the viewer and the intensity of the light 16 emitted by the light source 14 is significantly degraded.

A circular polarizer polarizes the ambient light 12 striking the light source 14 so that the fraction 10 of this light that is reflected from the surface of the light source is absorbed by the polarizer while the unpolarized light 16 emitted by the light source passes through the polarizer towards the viewer. The contrast enhancement provided by the polarizer is seriously limited, however, because the polarizer does not perfectly polarize the incident ambient light 12, the light source 14 may partially depolarize the ambient light 10 reflected from its surface, and the polarizer transmits only about thirty-five percent of the light 16 emitted by the light source. The poor transmission efficiency of the polarizer also seriously degrades the intensity of the light source output.

SUMMARY OF THE INVENTION

It is the principal object of this invention to provide a solid state light source in which under high ambient light conditions the contrast between the light emitted by the light source and the surrounding area is substantially enhanced without significantly degrading the intensity of the light emitted by the light source.

This object is accomplished according to the illustrated embodiment of this invention by providing source means for emitting in close proximity to one end of the visible spectrum a narrow band of light having a width of not substantially greater than two hundred and fifty angstroms at its half-power points. A light filter having a pass characteristic that does not extend substantially further into the visible spectrum than does the narrow band of light emitted by the source means is placed in the light path between the source means and the eye of the viewer so as to substantially pass this narrow band of light substantially to the exclusion of the remaining light of the visible spectrum.

DESCRIPTION OF THE PREFERRED EMBODIMENT

Figure 1:
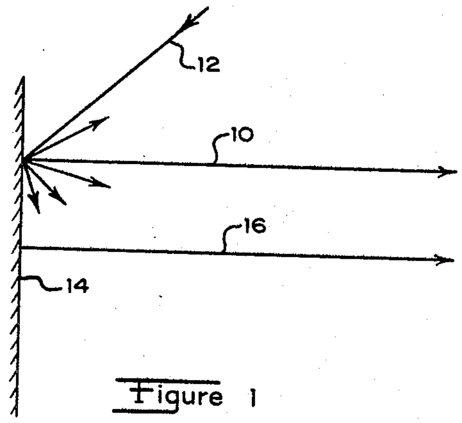
FIGURE 1, already referred to above, is a schematic diagram illustrating how the contrast between the light emitted by a solid state light source and the surrounding area is reduced by ambient light reflected from the light source.
Figure 2:
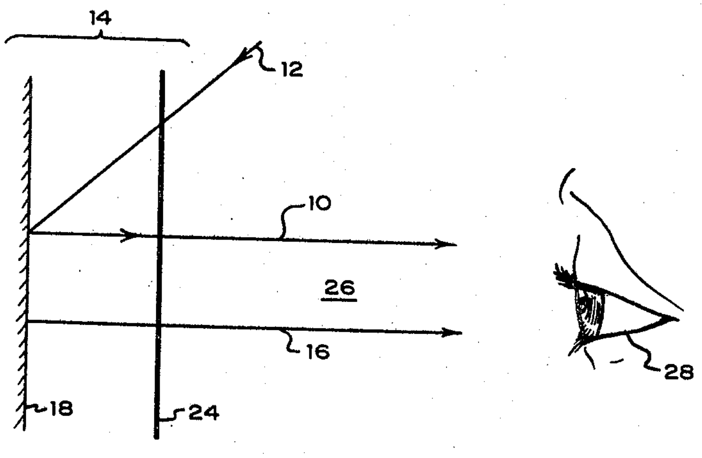
FIGURE 2 is a schematic diagram illustrating the preferred embodiment of this invention.
Figure 3:
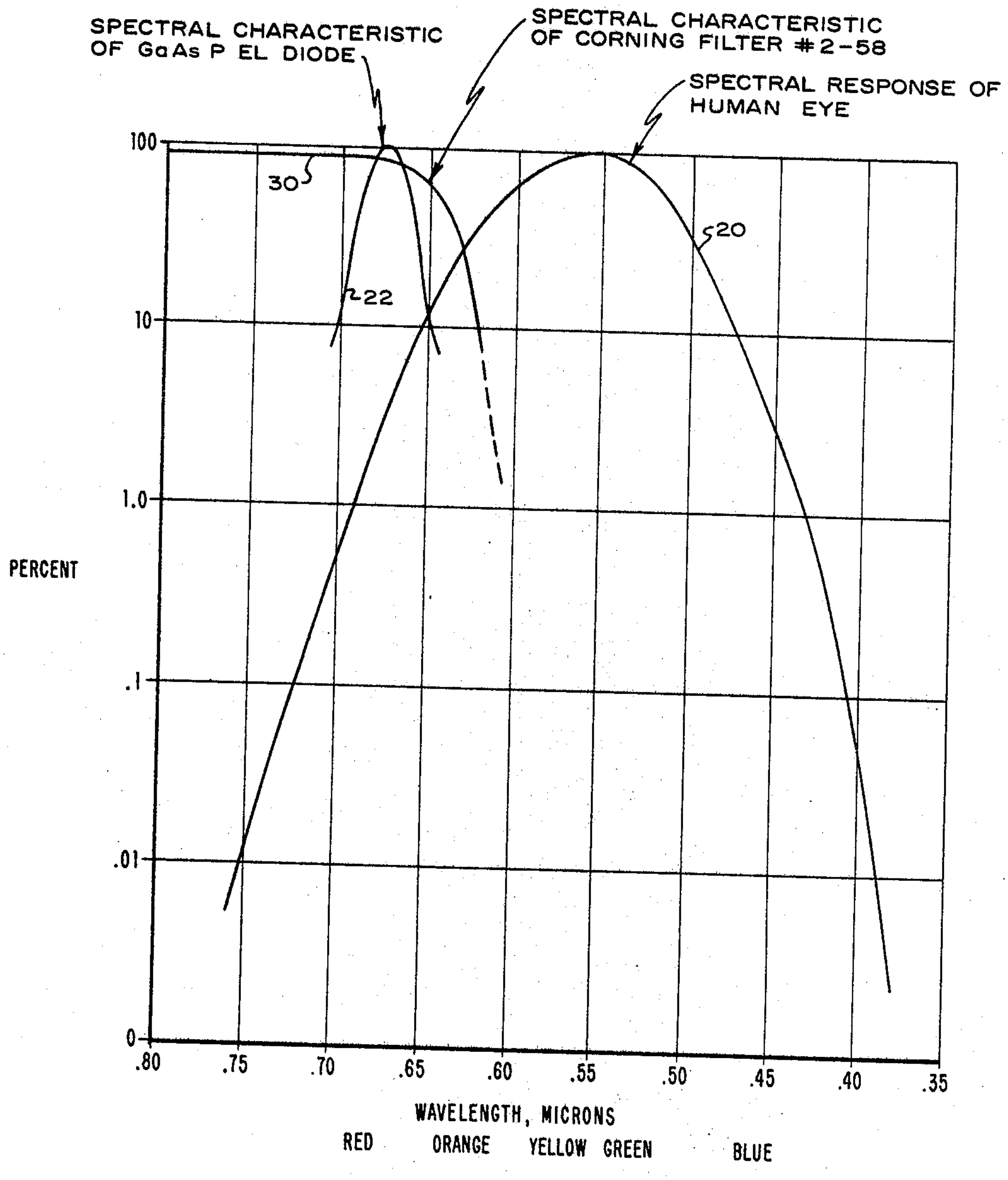
FIGURE 3 is a diagram illustrating the spectral response of the human eye and the spectral characteristics of the red filter and the GaAsP EL diode of FIGURE 2.

Referring now to FIGURE 2, there is shown schematically a solid state light source 14 comprising a GaAsP EL diode 18 with about eighteen percent phophorus content by mole fraction. When forward current is applied through the diode 18, the diode emits a narrow band of red light 16 having a width of about two hundred and fifty angstroms at its half-power points. As shown in FIGURE 3 by the spectral reponse 20 of the human eye and the spectral characteristic 22 of the diode 18, this narrow band of red light is located near the long wavelength end of the visible spectrum of the human eye.

A red filter 24, such as the Corning filter #2–58 manufactured by Corning Glass Works of Corning, N.Y., is placed in the light path 26 between the diode 18 and the eye 28 of the viewer in order to improve the contrast between the light 16 emitted by the diode and the surrounding area. The red filter 24 may be placed anywhere in this light path 26. For example, it may be placed near the eye 28, such as in a pair of goggles, so as to partially shade the eye. The natural adjustment of the iris of the viewer to this shading tends to enhance both the contrast between the emitted light 16 and the surrounding area and the apparent brightness of the emitted light 16.

As shown in FIGURE 3 by its spectral characteristic 30, the red filter 24 has a long wavelength passband that does not extend substantially further into the visible spectrum than does the narrow band of red light 16 emitted by the diode 18. Since the narrow band of red light 16 emitted by the diode 18 is in close proximity to the long wavelength end of the visible spectrum, the red filter 24 passes this narrow band of red light substantially to the exclusion of the remaining light of the visible spectrum. The red filter 24 also has a very sharp cutoff and, as shown in FIGURE 3 by its spectral characteristic 30, passes about eighty-eight percent of the light in its passband. Thus, the red filter 24 substantially enhances the contrast between the red light 16 emitted by the diode 18 and the surrounding area by greatly reducing the ambient light 10 and 12 reflected from the light source 14 to the eye 28 of the viewer without significantly degrading the intensity of the red light emitted by the diode 18. For example, during separate tests made in such high ambient light as is produced by afternoon sunlight, incandescent light, or fluorescent light the red filter 24 was found to enhance the contrast between the red light emitted by the diode 18 and the surrounding area by about fifty to two hundred times as much as a gray filter or about two to ten times as much as a circular polarizer.

Although the preferred embodiment of this invention has been described in the context of a narrow band of red light in close proximity to the long wavelength end of the visible spectrum, the principles of this invention might also be applied, for example, in the context of a narrow band of blue light located in close proximity to the short wavelength end of the visible spectrum.

I claim:

1. A solid state light source providing an enhanced contrast between the light source output and the immediately surrounding area by substantially reducing the ambient light reflected from the immediately surrounding area towards the viewer without significantly degrading the intensity of the light emitted by the light source, said light source comprising:

a solid state light emitting device for emitting a narrow band of visible light near only one end of the visible spectrum, said narrow band of visible light having a width of not substantially greater than two hundred and fifty angstroms at its half-power points; and a light filter having a pass characteristic that monotonically decreases from more than about seventy percent at a point not substantially further into the visible spectrum than the narrow band of visible light to less than about one percent at a point further into the visible spectrum, said light filter being placed in the light path between the solid state light emitting device and the eye of a viewer and acting in conjunction with the spectral response of the eye of the viewer to provide a passband for passing substantially only the narrow band of visible light emitted by said solid state light emitting device.

2. A solid state light source as in claim 1 wherein:

said solid state light emitting device comprises a gallium-arsenside-phosphide electroluminescent diode for emitting a narrow band of visible red light near the long wavelength end of the visible spectrum; and said light filter comprises a red filter having a long wavelength pass characteristic that does not extend substantially further into the visible spectrum than does the narrow band of visible red light emitted by said gallium-arsenide-phosphide electroluminescent diode.

References Cited

UNITED STATES PATENTS

| | | | |
|---|---|---|---|
| 2,419,177 | 4/1947 | Steadman | 178—7.86 X |
| 2,436,847 | 3/1948 | Wolfson | 178—7.86 X |
| 3,143,683 | 8/1964 | Duncan et al. | 178—7.86 X |
| 3,283,160 | 11/1966 | Levitt et al. | |
| 3,308,452 | 3/1967 | Michel et al. | |
| 3,321,631 | 5/1967 | Biard et al. | |
| 3,378,636 | 4/1968 | Hamilton | 313—112 X |
| 3,382,393 | 5/1968 | Schwartz | 313—112 X |

NORTON ANSHER, Primary Examiner

RICHARD M. SHEER, Assistant Examiner

U.S. Cl. X.R.

178—7.86; 313—108, 112